May 13, 1947.  T. I. RESS  2,420,444
INTERMITTENT MECHANISM
Filed Aug. 29, 1944
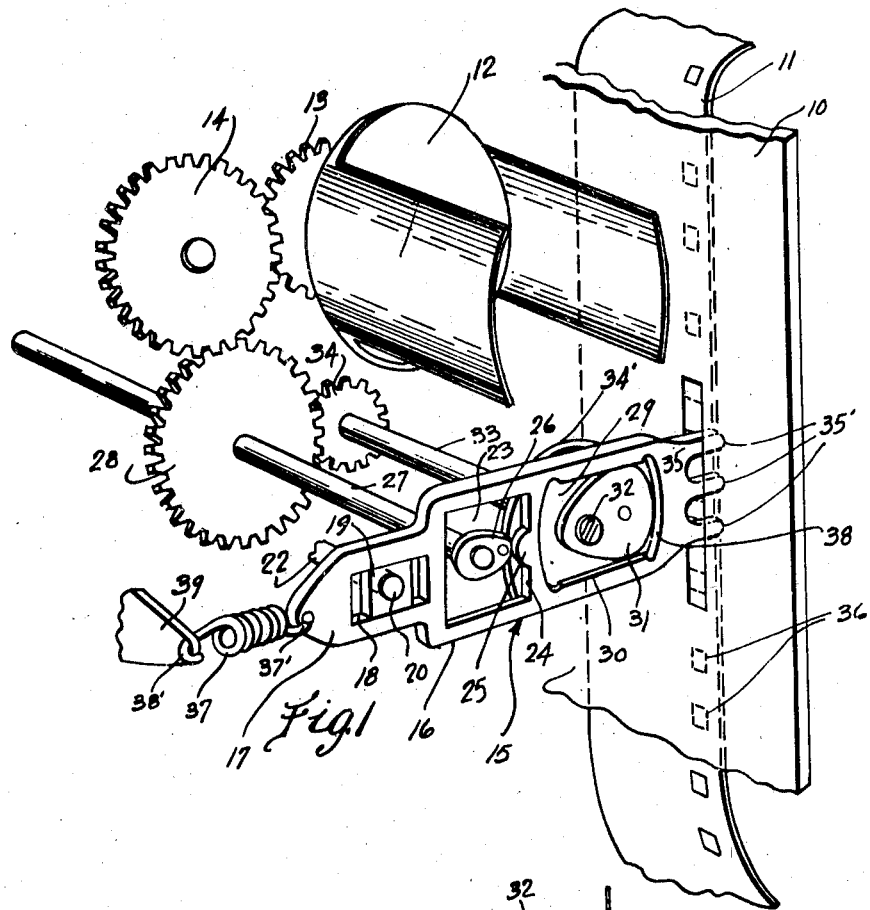
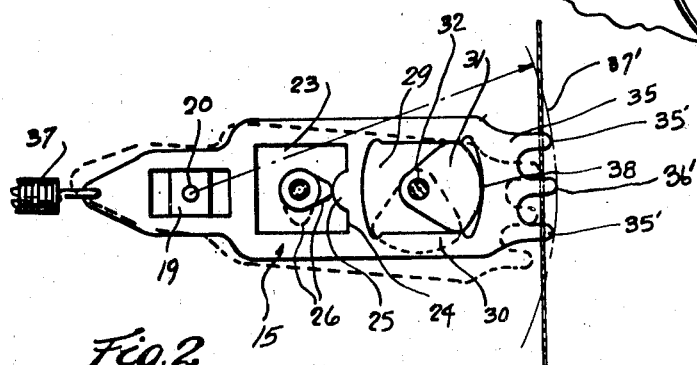
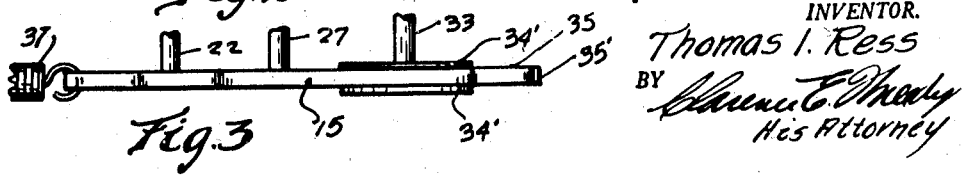
INVENTOR.
Thomas I. Ress
BY
His Attorney Patented May 13, 1947

2,420,444

UNITED STATES PATENT OFFICE 2,420,444

INTERMITTENT MECHANISM

Thomas I. Ress, Chicago, Ill., assignor to De Vry Corporation, Chicago, Ill., a corporation of Illinois Application August 29, 1944, Serial No. 551,727

5 Claims. (Cl. 88—18.4)

1

This invention relates to new and useful improvements in intermittent mechanism for motion picture projecting machines, and has for its principal object the provision of a new construction of the character hereinafter set forth, which will be highly efficient in use and economical in manufacture.

In order to obtain the best picture with the least expenditure of light it is desirable to employ an intermittent mechanism which will move the film very rapidly so as to allow the greatest possible length of time for the stationary picture and to this end the present invention has as one of its salient objects.

Another and equally important object of the invention is the provision of an intermittent movement which will result in a fast pull-down merging to a gradual rest followed by a straight line film disengagement movement thus avoiding jerking or jamming and excessive wear of the film.

A still further and important object of the invention is the provision of an intermittent movement which will be substantially noiseless in its operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentaray perspective view of a motion picture projecting machine illustrating my improved high-speed intermittent movement associated therewith.

Fig. 2 is a side elevational view of the intermittent movement embodied in the invention.

Fig. 3 is a fragmentary plan view of the intermittent movement embodied in my invention.

The drawings illustrate the preferred form of construction of my invention by which the several above-mentioned and other objects of the invention are accomplished.

The standard motion picture machine comprises an aperture plate 10 over which a strip of film 11 is payed in a manner well-known in the art. To the rear of this aperture there is a shutter 12, the shutter, in the present instance, being what is known in the art as the "barrel" type. This shutter is operated by a driving gear 14.

My improved intermittent mechanism is indicated generally at 15 and comprises a frame 16. This frame 16, at one end, has a reduced portion 17 and formed in this reduced portion

2

17 is a substantially rectangular opening 18. Fitting into this opening 18 is a shoe or block 19 pivoted as at 20 to a supporting stud 22 which has for its support a suitable bearing (not shown) extending from the frame of the motion picture machine. The frame 16 provides an opening 23. On the edge 24 of this opening 23 is a cam lip 25 adapted to have operative engagement with a cam disc 26. This cam disc 26 is carried by a shaft 27 having driving connection with the driving gear 14 through the medium of a gear 28.

Adjacent the opening 23, the frame 16 provides a forward opening 29. Operating in this opening 29 in contact with the edges 30 and 38 thereof is a cam 31. This cam 31 is connected as at 32 to a shaft 33 having operative connection with the gear 28 through the medium of a gear 34.

The shaft 33 carries spaced discs 34', (Figs. 1 and 3) serving to guide the frame 16 in its various movements.

Formed as an integral part of the frame 16 is a claw 35 in the form of a plurality of fingers 35' spaced to extend into the perforations 36 formed in the film 11, the forward ends 36' of these fingers 35' being defined by a radius illustrated by the line 37'. When the frame is projected forwardly by the action of the cam disc 26 engaging the cam lip 25, the claw 35 will be projected into the perforations 36 against the action of a spring 37 having one end portion connected as at 37' to the frame and an opposite end portion 38' connected to a bracket 39 of a motion picture projecting machine.

The cam 31 moves in a clockwise direction to give oscillatory movement to the frame 16. During this movement of the cam 31, the cam disc 26 rotates in an anticlockwise direction. During this rotation the frame 16 is retracted by the action of the spring 37 after which the cam disc 26 being brought into engagement with the cam lip 25 reproject the frame against the action of the spring 37.

By referring to the drawing it will be noted that the ratio between the gears 28 and 34 is such that the gear 34 revolves three times to each revolution of the gear 28. The reason for this is that this ratio permits the frame to make two complete oscillatory movements before it is projected in a position to engage the fingers of the claw 35 in the apertures 36 of the film.

This movement results in obtaining the best picture with the least expenditure of light so as to allow the greatest possible length of time for the stationary picture. It will also be seen that the relationship of the cam 31 with respect to the frame is such that there is a fast pulldown action on the film, thus permitting the employment of a shutter having relatively small blades, with the consequent result of maximum light passage, thereby improving picture reception to the eye of the observer.

In the present arrangement the shutter cuts the light three times per frame. This is permitted by reason of the fact that the intermittent movement is synchronized with the operation of the shutter such that it will operate at substantially high speed. I have found that such an arrangement produces more improved picture reception to the eye. As there is no back lash between the cams and frames, it is obvious that the intermittent movement is not only smooth in its operation but is substantially noiseless and that its forward and oscillatory movement is guided by reason of the slidable relationship between the frame and the shoe 19.

From the foregoing description it is apparent that I have provided an intermittent movement in which a cam and spring cooperate for moving the frame at high speed into and out of engagement with the perforations of a film while a second cam, independent of the first cam moves in timed relation with the first cam to move the frame into position for reprojection of the claw fingers into engagement with the perforations 36 of the film.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a skip movement for the film of a motion picture projecting machine comprising a reciprocal frame having a cam slot formed therein and an opening adjacent the cam slot, with an edge defining said opening provided with a cam lip extending laterally from said edge into the opening, a cam mounted in the cam slot of said frame, a cam operable in said opening and adapted to intermittently engage with the cam lip for reciprocating said frame in one direction, means for reciprocating said frame in an opposite direction when said cam is disengaged from said cam lip, claw elements provided by said frame and adapted to engage the perforations formed in a film strip, and means for operatively connecting said cams together for synchronized operation with respect to each other.

2. A skip movement for the film of a motion picture machine comprising a frame having a cam slot formed therein and having an opening formed adjacent the slot, means for supporting said frame for reciprocating movement and for oscillatory movement, a cam in the cam slot for rotating said frame, a cam lip provided by said frame and projecting laterally from an edge of said opening into said opening, means for reciprocating said frame in one direction, and a cam element in said opening and adapted to engage said cam lip for reciprocating said frame in an opposite direction.

3. A skip movement for the film of a motion picture machine comprising a frame having a cam slot formed therein and having an opening formed adjacent the slot, means for supporting said frame for reciprocating movement and for oscillatory movement, a cam in the cam slot for rotating said frame, a cam lip provided by said frame and projecting laterally from an edge of said opening into said opening, spring means for reciprocating said frame in one direction, and a cam element in said opening and adapted to engage said cam lip for reciprocating said frame in an opposite direction.

4. A skip movement for the film of a motion picture machine comprising a frame having a cam slot formed therein and having an opening formed adjacent the slot, means for supporting said frame for reciprocating movement and for oscillatory movement, a cam in the cam slot for rotating said frame, a cam lip provided by said frame and projecting laterally from an edge of said opening into said opening, means for reciprocating said frame in one direction, and a cam element in said opening and adapted to engage said cam lip for reciprocating said frame in an opposite direction, and drive means common to both of said cams for oscillating said cams in synchronized movement with respect to each other.

5. A skip movement for the film of a motion picture machine comprising a frame having a cam slot formed therein and having an opening formed adjacent the slot, means for supporting said frame for reciprocating movement and for oscillatory movement, a cam in the cam slot for rotating said frame, a cam lip provided by said frame and projecting laterally from an edge of said opening into said opening, spring means for reciprocating said frame in one direction, a cam element in said opening and adapted to engage said cam lip for reciprocating said frame in an opposite direction, and drive means common to both of said cams for oscillating said cams in synchronized movement with respect to each other.

THOMAS I. RESS.

REFERENCES CITED

The following references are of record in the file of this patent:

UNITED STATES PATENTS

| Number | Name | Date |
|---|---|---|
| 2,029,930 | Martin | Feb. 4, 1936 |
| 1,716,463 | Riddell | June 11, 1929 |
| 1,871,335 | Merle | Aug. 9, 1932 |
| 2,152,624 | Cazes | Apr. 4, 1939 |
| 2,200,342 | Reardon | May 14, 1940 |
| 2,148,493 | Nowland | Feb. 28, 1939 |

FOREIGN PATENTS

| Number | Country | Date |
|---|---|---|
| 571,422 | Germany | Mar. 1, 1933 |
| 227,362 | Great Britain | Jan. 15, 1925 |
| 232,186 | Great Britain | June 3, 1926 |